May 12, 1936.　　　D. S. COLE　　　2,040,468

ELECTRIC GENERATING SYSTEM

Filed April 8, 1932　　3 Sheets-Sheet 1

INVENTOR.
Dale S. Cole.
Slough and Canfield
ATTORNEY.

May 12, 1936.　　　D. S. COLE　　　2,040,468
ELECTRIC GENERATING SYSTEM
Filed April 8, 1932　　　3 Sheets-Sheet 2
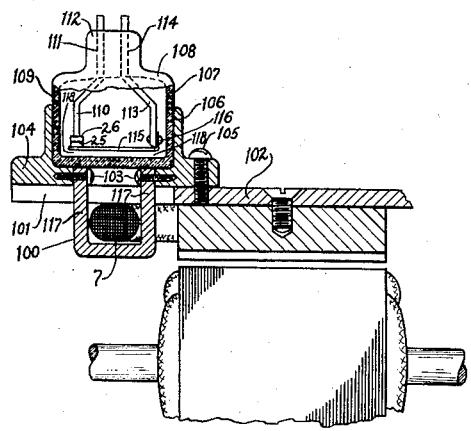
Fig. 4
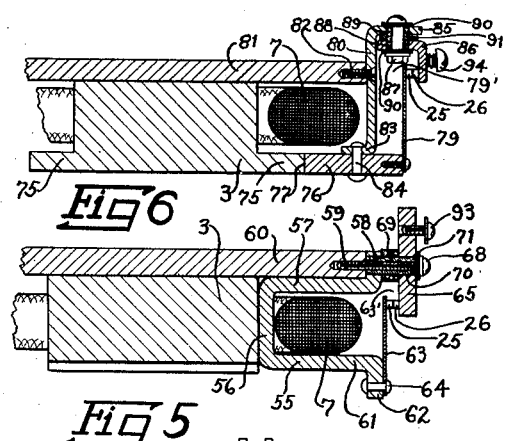
Fig. 6
Fig. 5
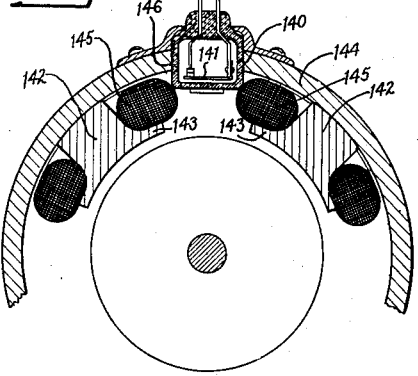
Fig. 9
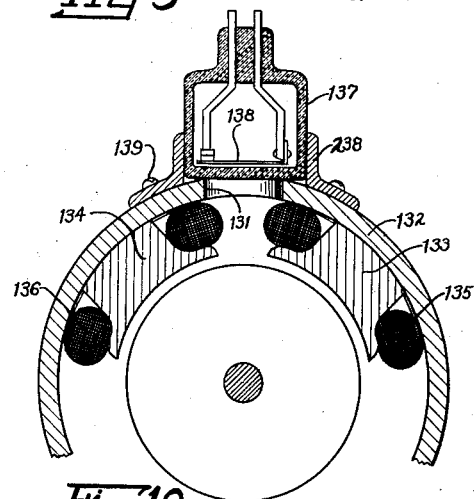
Fig. 10
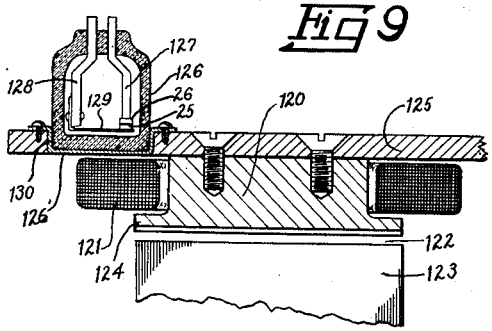
Fig. 7
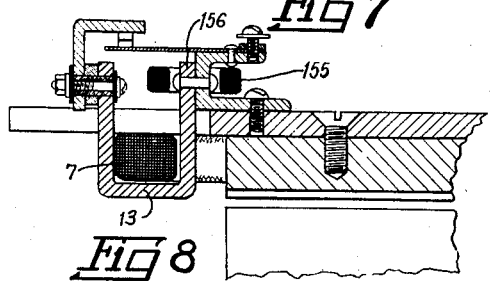
Fig. 8
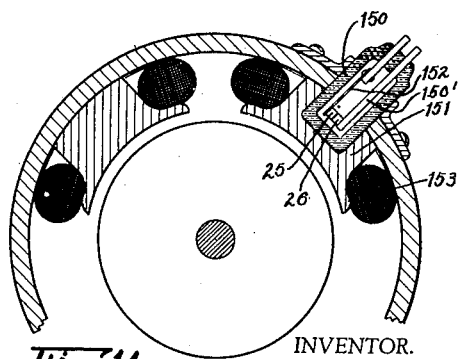
Fig. 11
INVENTOR.
Dale S. Cole.
BY
Slough and Caufield
ATTORNEY.

May 12, 1936.  D. S. COLE  2,040,468

ELECTRIC GENERATING SYSTEM

Filed April 8, 1932   3 Sheets-Sheet 3

INVENTOR.
Dale S. Cole.
BY
Slough and Canfield
ATTORNEY.

Patented May 12, 1936

2,040,468

UNITED STATES PATENT OFFICE 2,040,468

ELECTRIC GENERATING SYSTEM

Dale S. Cole, Cleveland Heights, Ohio, assignor, by mesne assignments, to The Leece-Neville Company, Cleveland, Ohio, a corporation of Ohio Application April 8, 1932, Serial No. 604,035

21 Claims. (Cl. 171—223)

This invention relates to electric generating systems and apparatus, and particularly to generating systems and apparatus in which an electric generator is rotatably driven by a variable speed source of power.

Typical of such generating systems and apparatus is that employed on automotive vehicles, wherein an electric generator is driven by the vehicle engine.

Such systems commonly include a storage battery, lamp and other apparatus energized by current from the generator, and various means have been accordingly devised to regulate or control the output of the variable speed generator to maintain the same within limits suitable for the energized apparatus.

For example, in some systems the current output has been controlled or regulated by the so-called "third brush" generator construction; in another system, the generated voltage has been regulated by so-called "voltage regulation" apparatus accessory to the generator.

Both the current regulation systems and voltage regulation systems heretofore employed have merits which have led to their use on motor driven vehicles.

The control of the generator output by regulating its voltage is generally recognized as superior to the current regulation, particularly when storage batteries and lamps are to be energized by the generator; but its general adoption has been prevented by the relatively great cost of the apparatus accessory to the generator by which the voltage regulation is effected.

In a typical voltage regulation system and apparatus for example, a regulating panel is provided on which is mounted an electro-magnetic relay having its winding energized by the generator voltage; and the contacts of the relay control the energization of the generator field winding. Upon a rise of voltage above the predetermined desired value, the relay contacts are operated magnetically to break the field winding circuit, or to insert resistance in series with the field winding or otherwise to weaken the field to effect a reduction of voltage. When the voltage falls to the predetermined value, the relay contacts are operated by a spring to restore the field circuit. In operation, such relays open and close rapidly with a vibratory movement.

It is the added cost of manufacturing and installing such regulator panels and the vibratory electro-magnetic relays and other necessary parts thereon which has largely prevented the general adoption of the voltage regulated generator systems for automotive vehicles, and which has confined its use to a limited field of application.

My instant invention therefore has for one of its objects the provision of an improved method and means whereby the voltage output of a variable speed electric generator may be regulated to a substantially constant value at all speeds within a predetermined working speed range.

Another object is to provide an improved electric generator construction which will deliver at its output terminals a substantially constant voltage at all speeds within a predetermined working speed range.

Another object is to provide an improved method and means whereby the current output of a variable speed generator may be limited to a predetermined maximum, and also the voltage output thereof may be regulated to a substantially constant value at all speeds within a predetermined working speed range.

Another object is to provide an improved electric generator construction which will deliver at its output terminals a substantially constant voltage and a current load limited to a determined maximum at all speeds of the generator within a predetermined working speed range.

Another object is to provide an improved regulating apparatus for effecting voltage regulation of a variable speed generator.

Another object is to provide a generator field circuit controller for effecting voltage regulation of a variable speed generator, and which will be cheaper to manufacture than the electro-magnetically vibrated relay apparatus now employed for this purpose.

Another object is to provide a controller means whereby the field flux strength of a variable speed electric generator may be controlled to effect a substantially constant voltage at the generator terminals within a working speed range, and the operation of which controller means may be effected by the field flux itself.

Another object is to provide a method and means whereby the voltage output of a variable speed generator may be regulated to a substantially constant value within a working speed range; and wherein field flux of the generator may be employed to effect the voltage regulation.

Another object is to provide an improved field energizing circuit for variable speed voltage regulation electric generators.

Another object is to provide, in a voltage regulated variable speed generating system of the type employing a vibrating switch contact in the field circuit, improved means for minimizing the tendency to arc at the contacts.

Another object is to provide, in a voltage regulated variable speed generating system of the type in which the field energization is rapidly changed, improved means for increasing the frequency of the changes to correspondingly increase the frequency of the resulting pulses of current in the work circuit of the generator.

Another object is to provide for electric generators and generating systems wherein switch contacts are opened and/or closed responsive to changes of electrical conditions of the system, an improved switch construction and mode of operation whereby the operation of the switch may be effected through the agency of the magnetic flux of the generator field.

Another object is to provide an improved construction for electric generators whereby the field flux or changes in the strength thereof may be employed to operate switch contacts.

My invention is fully disclosed in the following description taken in connection with the accompanying drawings in which Fig. 1 is a system diagram of electrical connections and apparatus illustrating in diagrammatic form some of the features of an embodiment of my invention;

Figure 1:
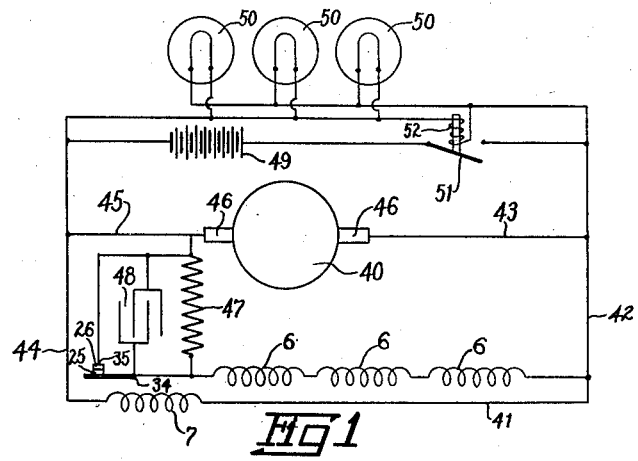
Figure 2:
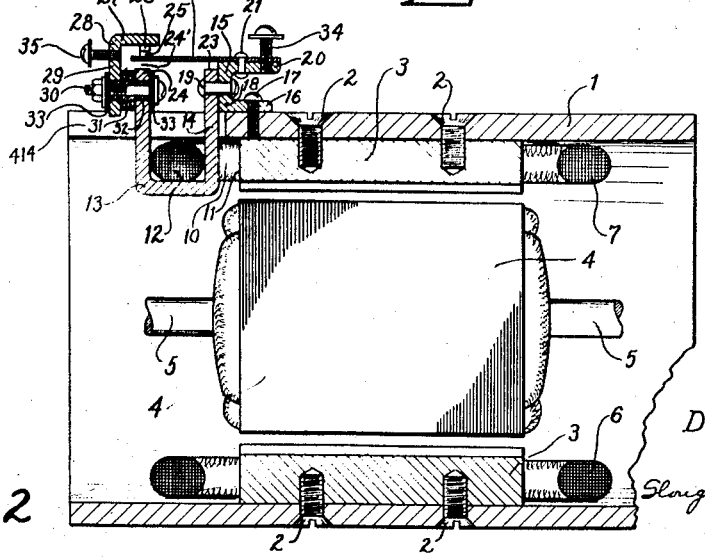
Fig. 2 is a simplified longitudinal, sectional view of an electric generator such as may be used in the system of Fig. 1, and embodying a part of my invention.
Figure 16:
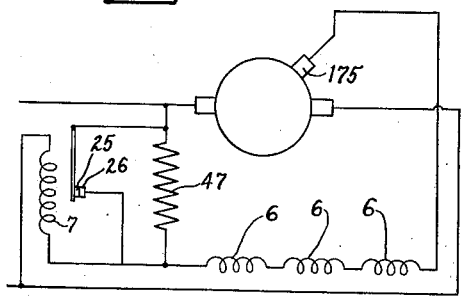
Figure 17:
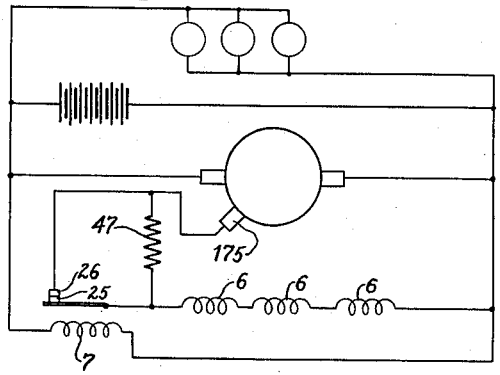
Figure 18:
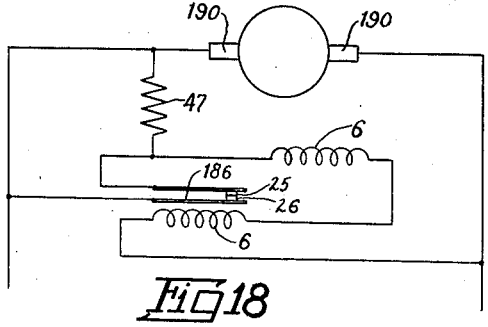

Figs. 4 to 8 inclusive are fragmentary views generally similar to a part of Fig. 2 and illustrating modifications of my invention;

Fig. 9 is a cross-sectional fragmentary view of an electric generator with parts thereof omitted for simplicity and illustrating a modification of my invention;

Figs. 10 and 11 are views generally similar to Fig. 9 but illustrating modifications;

Figs. 12, 13, 14 and 15 are diagrammatic views similar to Fig. 1 illustrating modifications;

Figs. 16 and 17 are other diagrammatic views illustrating other modifications in connection with a third brush type of generator construction which I may employ;

Fig. 18 is a diagrammatic view illustrating a system of circuits and apparatus which I may employ in connection with a bipolar generator.

Figure 3:
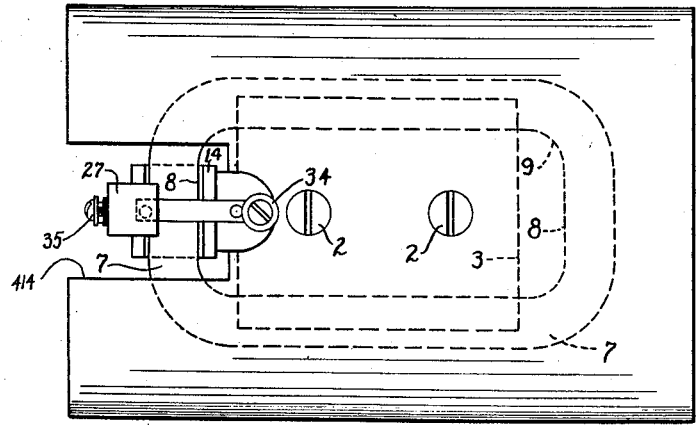
Fig. 3 is a top plan view of the generator elements of Fig. 2.

Referring to the drawings, I have shown in Fig. 1, 2 and 3 one embodiment of my invention and a system of circuit connections and apparatus whereby the embodiment of Figs. 2 and 3 may be practiced.

In Fig. 2 at 1, I have shown the hollow cylindrical steel shell constituting the yoke of an electric generator field. Such a shell type yoke is well known in this art and constitutes a part of a housing for the motor. The end plate, bearings for the armature shaft, etc., have been omitted for simplicity inasmuch as these parts constitute no essential part of my invention and are well understood by those skilled in this art.

Secured to the inner wall of the shell 1 as by screws 2—2 and projecting inwardly radially therefrom, I have shown at 3—3 two field poles. The generator of Fig. 2 is a multi-polar generator having a total of four poles 3, two only of which are shown in Fig. 2, in diametrically opposed relation.

An armature 4 supported on a shaft 5 may be rotatively driven between the poles 3 in a well known manner.

Each of the poles 3 has a winding for energizing the same; and the generator under consideration having four poles, is provided with windings 6—6—6 on 3 of the poles and a winding 7 on the fourth pole.

The field windings 6 and 7 are all of the same form and as usual in such constructions are preferably form wound. The poles 3 are rectangular as indicated in Fig. 3 being longer in the axial direction of the generator and the field windings are preferably form wound to lie colsely adjacent to the poles 3 on their long sides and to clear the ends of the poles as at 8 due to the relatively large radius, as at 9, to which the coils are wound. A space 10 is thus provided between the end 11 of the pole 3 and the end convolutions 12 of the windings.

At one end of the windings 7 as shown in Figs. 2 and 3, a U-shaped core 13 of iron or other ferrous material is linked with the windings 7 by projecting one leg 14 of the U upwardly through the space 10 above described. A recess 414 is cut or otherwise formed in the shell 1 upwardly through which the core 13 projects.

The core 13 is mounted upon the shell 1 by means of a channel shaped bracket 15, having one leg 16 secured to the shell 1 by a screw 17 and having the web 18 of the channel riveted as at 19 to the leg 14 of the core 13.

Riveted to the other leg 20 of the channel as at 21 is a resilient steel or other ferrous, magnetically tractable reed-like armature 22 which extends across and adjacent to the pole ends 23 and 24 of the U-shaped core. An air gap 24' is thus provided between the pole end 24 and the armature 22.

By this construction it will now be clear that current flowing in the windings 7 to produce field magnetism in the pole 3 of the generator will also produce magnetism in the core 13 which, acting across the air gap 24' will attract the armature 22 against its inherent resilience.

An electric contact 25 is mounted on the armature 22 and engages a mating contact 26 supported upon the overhanging arm 27 of a bracket 28 a vertical leg 29 of which is rigidly secured to and electrically insulated from the core 13 by a bolt 30, an insulating spacer 31, and the well known insulating sleeve or bushing 32 and washers 33 associated with the bolt 30.

An electric circuit terminal screw 34 may be associated with the contact 25 by being threaded into the leg 20 of the bracket above described and a terminal screw 35 may be provided corresponding to the contact 26 and threaded into the leg 29 of the bracket.

Referring now to the diagram of Fig. 1, the generator as a whole indicated conventionally at 40 energizes its own field windings, the winding of one pole, namely the winding 7 being connected by wires 41, 42, 43, 44 and 45 directly across the brushes 46—46 of the generator. The windings 6—6—6 are all connected in series and are connected across the generator brushes 46 through contacts 25 and 26 when these contacts are closed; or, when they are open, through a resistance 47; and a condenser 48 may if desired be provided to suppress arcing which may occur at the contacts 25—26 when they open.

The diagram 1 otherwise comprises a storage battery 49 connected across the mains 42 and 44 and therefore across the generator brushes and a plurality of lamps 50—50 connected across the mains 42 and 44.

The contacts 25 and 26 of Fig. 1 may be those of Fig. 2 and the points 34 and 35 of Fig. 1 illustrate the connections which may be made to the screws 34 and 35 of Fig. 2 in order to connect the apparatus of Fig. 2 in a diagram such as Fig. 1.

At 51 I have indicated a switch, operable by a winding 52 energized directly across the brushes 46 of the generator 40 to perform the well known function of closing the circuit through the battery 49 only when the generator is generating a voltage sufficient to balance or to charge the battery.

In the operation of the form of my invention shown in Figs. 1 to 3 inclusive, when the generator armature 4 is rotated, and its speed gradually increased, its field windings 6 and 7 are energized by a gradually increasing voltage and current. To properly charge the battery 49, assuming the same to be a "6 volt" battery, the generator voltage should not rise to a value exceeding some predetermined value such for example as 7 volts.

The energization of the winding 7 besides producing flux in the field pole 3, produces magnetic flux in the core 13, this flux flowing in the U-shaped core and across the air gap 24' through the armature 22.

The rising voltage of the generator as its speed increases, increases the energization of the field winding 7; and the resilience of the armature 22, length of air gap 24' and other features of the construction as will be understood by those skilled in this art, are so designed that when the voltage impressed on the field winding 7 rises to the predetermined value such as 7 volts, the flux generated in the core 13 will be sufficient to attract the armature 22 and separate the contacts 25—26. The circuit to the field windings 6—6—6 is thus broken, or the energization thereof is greatly reduced by insertion of a resistance such as that at 47 Fig. 1, and the generated voltage accordingly falls. The falling voltage decreases the energization of the winding 7 which decreases the flux in the core 13 and a point is reached at which the resilience of the armature 22 will cause it to retract from the pole 24 and to close the contacts 25—26 reestablishing the field circuit for the windings 6.

The voltage again rises and again the contacts 25—26 open and this action continues, the armature 22 moving with a rapid vibratory movement, to rapidly open and close the contacts 25—26. The voltage output of the generator thus is prevented from rising above 7 volts, for example, and may be prevented from falling any substantial amount by suitably determining the resilience of the armature 22, and thus the resultant voltage impressed by the generator on the battery and lamp circuit is substantially constant at all speeds above the minimum speed at which, with full field energization, it can generate 7 volts. Such a range of speed may be referred to as the working speed range.

As will now be clear, by the embodiment of my invention illustrated in Figs. 1 to 3, I have provided a means and method for regulating the voltage output of a variable speed generator wherein a field winding of the generator may be employed to function both as a field winding and as the exciting winding for a switch having contacts controlling the energization of the field circuit in a manner to maintain a voltage substantially constant, or within predetermined maximum and minimum limits, throughout a working speed range. The elements of the switch illustrated in Figs. 2 and 3 are adaptable to be mounted upon the generator itself thus dispensing with a separate supporting panel or the like. The generator including its regulating switch therefore, may be manufactured as a complete self-regulating generator unit, the generator delivering at its terminal brushes the said substantially constant voltage.

While I have illustrated at 48 a condenser, it may be omitted and is not an essential part of my invention.

One of the advantages of my invention as set forth above is that the cost of producing a voltage regulating generator is considerably reduced. The employment of a switch in the field circuit which can be mounted on the generator frame itself eliminates the necessity for an additional panel and support therefor; and the employment of the field winding as the energizing winding of the switch makes the provision of an electromagnet especially for operating the switch unnecessary.

The resistance unit 47, as in some prior art practice where resistance units are employed generally in generator field circuit, may be wound into a flat coil and attached to the outer surface of one of the field windings, as a support for the same.

In Fig. 5 I have shown another form of field circuit controlling switch. A U-shaped core element 55 has the closed end 56 of the U, looped through the field winding 7, or between an end portion thereof and the core 3. A leg 57 of the U, extends laterally from the pole 3 and an outwardly projecting flange portion thereof, 58, engages an end portion 59 of the generator field shell 60. The other leg 61 of the U extends generally parallel to the leg 57 and has at its extreme end an inwardly projecting flange 62. A resilient steel or other ferrous armature 63 is secured to the flange 62 as by a rivet 64 and carries at its opposite end the contact 25. The mating contact 26 is carried on a bracket 65 rigidly secured to the shell 60 by a screw 68 projected through a perforation in the bracket 65 and screw threaded into the shell 60. The bracket 65 is insulated by a spacing washer 69 between it and the flange 58 of the core element, and the screw 68 may, in the form illustrated, be projected also through a perforation in the flange 58 and thus serve to mount the U-shaped core element as well as the bracket 65, upon the shell 60. The bracket 65 may be further insulated from the screw 68 by the well known insulating bushing 70 and washer 71.

In operation, magnetism generated by the winding 7 flows through the U-shaped element 55 and armature 63 and across the air gap 63' between the end of the armature and the flange 58 or leg 57 to break contact at 25—26.

In Fig. 6 I have shown another modification of the switch construction. This form is particularly adapted to generate poles 3 having shoes 75 of increased area at their inner pole ends. In this form, a core element 76 at its inner end as at 77 abuts upon the end of the shoe 75 and extends laterally therefrom at its ends, the armature 79 is supported bearing the contact 25. A brass or other non-magnetic Z-shaped bracket 80 has its web secured to the shell 81 as by a screw 82, and to one flange 83 thereof the core element 76 is riveted as at 84. The other flange 85 of the bracket supports a non-magnetic contact element 86 generally of angle form and bearing the contact 26 at the end of one angle leg, the other angle leg being rigidly connected to and supported upon the bracket flange 85 by a screw 87 projected through suitable perforations 88 and 89 respectively in the flange 85 and corresponding leg of the angle element 86 and insulated therefrom by the usual well known insulating washers 90—90 and bushing 91, and the angle element 86 and bracket being insulated from each other by an insulating spacer 92.

Flux produced by the winding 7 for generating purposes may flow out of the core 3 and some of this flux in a parallel path may flow through the core element 76, armature 79 and across the air gap 79' to the field shell 81 to operate the contacts 25—26.

In the form of Fig. 5 above described, a connection to the contact 25 may be a ground connection and a connection to the contact 26 may be made in any suitable manner to the bracket 65 as for example by a screw 93. And in the form of Fig. 6, connection to the contact 25 may be made to a ground on the frame and connection to the contact 26 may be made to the angle form support 86 in any suitable manner as for example by a screw 94.

In the modification shown in Fig. 4, a U-shaped core element 100 is looped through the field winding 7, the legs of the U being outwardly directed and projecting through a suitable recess 101 in the shell 102 of the generator, and are secured as by screws 103—103 to a non-magnetic base 104 secured to the shell 102 externally theerof as by a screw 105. The base 104 comprises an outwardly open receptacle portion 106 by which is supported a vacuum tube switch 107.

The switch 107 and its receptacle 106 may be variously constructed. In the form illustrated the switch comprises a bottle of glass or other hermetically sealable material having a body portion 109 formed to suitably engage the receptacle 106. A terminal 110 supporting a contact 26 on the end thereof is disposed within the bottle and has a portion 111 passing outwardly through a head 112 of the bottle and hermetically sealed therein. Another element 113 is similarly sealed in the head at 114 and internally of the bottle has riveted thereto one end of a steel or other ferrous armature 115 as for example by a rivet at 116. The armature 115 bears the contact 25.

In operation, magnetic flux generated in the core 100 by the winding 7 emanates from the ends of the legs 117—117 of the U-shaped core 100, crosses the air gaps 118—118 between the ends of the armature 115 to attract the armature and open the contacts 25—26.

This form of my invention has the advantage that the contacts may be operated in a vacuum, or in any desired gaseous content of the sealed bottle 107 for the well known advantageous reasons.

In the foregoing I have illustrated and described a number of different constructions whereby I may provide a field circuit controlling switch having an armature moved by flux generated in a local magnetic circuit by one of the field windings, the local circuit comprising a defined flux path preferably looped through the winding.

In some cases, it may be desirable to employ for the purpose of operating the switch, flux which is generated by the field winding but as in the nature of "leakage" flux, that is flux which normally finds a return path from the field pole to the field yoke element without performing any useful purpose. In Fig. 7 I have illustrated one such modification of my invention. In this figure, the core 120 is energized by field winding 121 and the major part of the flux generated flows from the core 120 across the armature gap 122 into the armature 123 and performs its normal functions of generating voltage in windings of the armature. A portion of the flux however, will in a well known manner, flow from outer portions of the core 120, such for example as the ends or lateral portions of the core shoe 124, directly around the winding 120 to the shell 125 to complete the magnetic circuit. To utilize this leakage flux to operate a switch armature according to my invention, I may provide a glass vacuum switch bottle 126 containing a circuit contact supporting element 127 and an armature supporting element 128 and an armature 129, the armature element carrying a contact 25 and the element 127 carrying a contact 26. The bottle 126 may be inserted into a recess 130 formed in the shell 125 whereby the armature 129 will be disposed in the path of the leakage flux above described on its return back to the shell.

Any suitable receptacle 126' may be provided to support the bottle 126 and thus the recess 130 may be of any desired size or shape to facilitate the flow of magnetism through the armature 129.

In Fig. 10 I have shown another form of my invention utilizing leakage flux. In this form, a recess or perforation 131 is made in the yoke or shell 132 of the generator in the path of the flux flowing between two field poles such as the poles 133 and 134 having energizing windings 135 and 136 respectively. As is well known, if the ferrous path of flux, as for example in the yoke under consideration, be interrupted as by a perforation or recess or other air gap in the path, the flux crossing the gap will fan out, and cross the gap along outwardly curving lines of direction particularly if the gap is of substantial width. In utilizing this principle in the form of Fig. 10, a glass vacuum bottle 137 having the general construction of the bottle 107 of Fig. 4 or 126 of Fig. 7, is disposed externally of the shell 132 with the armature 138 thereof in the path of the lines of flux leaking across the recess or perforation 131. The bottle 137 may be supported in a suitable receptacle 238 secured on the shell as by screws 139.

Thus in the form of Fig. 10, leakage flux is intentionally provided to operate the field circuit controlling switch contacts.

In the form of my invention shown in Fig. 9, a construction similar to that of Fig. 10 is provided but the vacuum bottle 140 is disposed sufficiently inwardly radially to bring its armature 141 into the path of leakage flux from one or both of the cores 142—142 and emanating from the terminations of the cores as, for example, at the edges of the shoes 143—143, and leaking back to the shell 144 externally of the field energizing windings 145—145. The bottle 140 may be disposed in a perforation or recess 146 in the field shell 144.

In the form of Fig. 9, either the leakage flux alone may be relied upon to operate the armature 141, or the leakage flux in combination with flux in the shell 140 flowing from one core 142 to the other, and crossing the gap made by the recess or perforation 146.

In Fig. 11, a modification is shown in which the vacuum switch contact containing bottle 150 is embedded in the field pole 151. The armature 152 within the bottle is so disposed, in the path of the lines of flux generated in the core 151 by a field winding 153 as to move in a direction to open the contacts 25 and 26 at values of energization above a predetermined value. In this form, the support 150' for the contact 26 may if desired be made of ferrous material; and in this case the support 150' and armature 152 may act repellingly, being of like polarity, to repel the armature 152 to break the contact at 25—26.

From the foregoing it will now be clear that the field circuit controlling contacts 25 and 26 may be operated according to the practice of my invention as described hereinbefore, by flux produced by a field winding or by the joint flux of a plurality of windings; and that the flux may flow in a defined and independent path as for example in the forms of Figs. 2, 4, 5 and 6; or the flux may be leakage flux which in the usual generator construction serves no useful purposes as in the forms of Figs. 7 and 9; or it may be leakage flux intentionally caused to occur as in the form of Figs. 9 and 10; or it may be flux flowing through a field core as in the form of Fig. 11.

While I may prefer to employ the voltage regulating system of connections of Fig. 1, with or without the condenser 48, and with or without the resistance unit 47, I have shown herein other systems of connections in which some or all of the advantages of my invention may be enjoyed.

Figure 12:
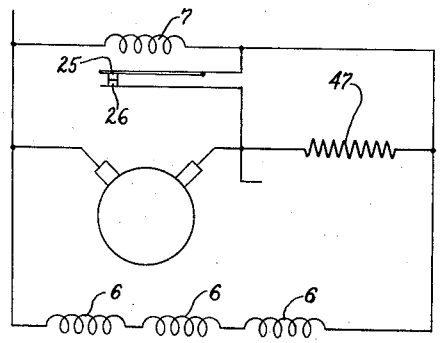

In Fig. 12 I have illustrated in simplified form omitting batteries, lamps, etc., a modification of the diagram of Fig. 1. In Fig. 12, the resistance unit 47 is so connected that it is normally short-circuited on the contacts 25—26, when these contacts are opened by magnetic energization from the field winding 7, the resistance 47 is in the path of the current flowing to the winding 7 as well as that flowing to the windings 6—6—6 and thus reduces the current in all of the windings.

Figure 13:
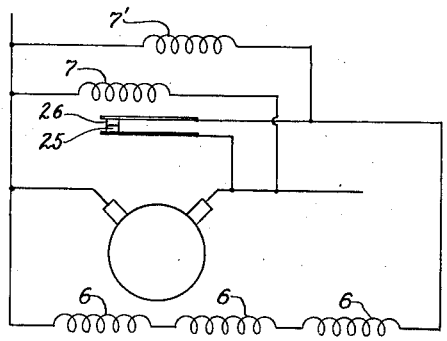

In the modification shown in Fig. 13, the regulating winding 7 is in two parts 7 and 7'. Part 7 is connected directly across the generator terminals. The part 7' is connected across the terminals through the contacts 25—26, and the field windings 6—6—6 are connected across the terminals through the contacts 25 and 26.

The two parts 7 and 7' of the field windings are wound in the same direction so as to assist each other and may be parts of a single winding wound on a single field pole.

In this system of connections, no resistance unit 47 is employed. When the contacts 25—26 open, the field windings 6—6—6 may discharge back through the portion 7' of the winding so that the part 7' now opposes the part 7 and partly neutralizes it; and furthermore, apart from the reverse energizing current from the discharging field, the opening of the contacts 25—26 effects a reduction of potential upon the winding 7'. Thus the net energization of the windings 7—7' is greatly weakened. As a consequence the whole generator field is quickly weakened; and the generated voltage drops quickly; and the armature quickly retracts to close the contacts 25—26; arcing at the contacts 25—26 is quickly suppressed; and the frequency of opening and closing of the contacts is increased resulting in a lessened tendency for lamps, that may be energized by the generator, to flicker.

In Fig. 8 I have illustrated a modification of apparatus whereby the general effect of the two part winding 7—7' of Fig. 13 may be attained. The construction of this figure will be recognized as substantially the same as that of Fig. 2 but having in addition a winding 155 encircling one leg 156 of the U-shaped core element 13. The winding 155 may be connected in the circuit similarly to the winding 7' of Fig. 13 and wound to assist the flux in the core element 13 generated by the winding 7. Upon breaking of the circuit of the field windings 6—6—6, the winding 155 will exert a bucking action to effect results similar to those of the winding 7'.

Figure 14:
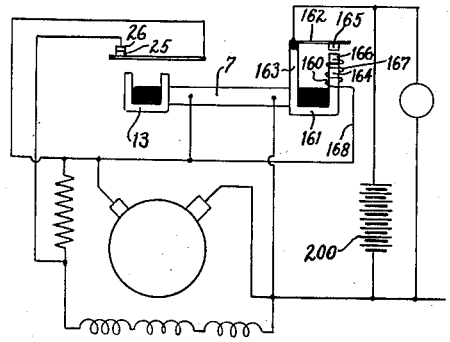

In the modification shown in Fig. 14, not only are the field controlled circuit contacts 25—26 opened by flux from a field winding, but a circuit breaker and reverse current relay shown generally at 160 is also operated by flux from a field winding. In the particular disclosure of Fig. 14, both devices are operated from a single field winding 7. The U-shaped core element 13 and the manner of its operating contacts 25 and 26 to effect voltage regulation has already been explained. Another part of the winding 7, preferably an opposite end portion thereof, has looped therethrough another generally U-shaped core element 161 whereby it may receive flux produced by the winding 7. A resilient steel or other ferrous armature 162 is secured at one end to and insulated from a leg 163 of the U-shaped element and the other end is disposed opposite the end of the other leg 164. A contact 165 is carried by the end of the armature 162 and a stationary contact 166 is disposed adjacent to contact 165. A winding 167 around the leg 164 has one end thereof connected to the contact 166 and the other connected by a wire 168 to one side of the generator.

The generator voltage is impressed upon the winding 7 and when, upon increasing speed of the generator, it reaches a value sufficient to charge or "float" the battery 200, the armature 162 will be attracted by the core 161 and close the contacts 165—166. Current may then flow from the generator to the battery through the contacts 165—166 and through winding 167. Upon reduction of voltage the battery 200 will cause current to flow reversely through the winding 167 neutralizing the effect of winding 7 and open the contacts at 165—166 in a well known manner to protect the battery against discharge.

Figure 15:
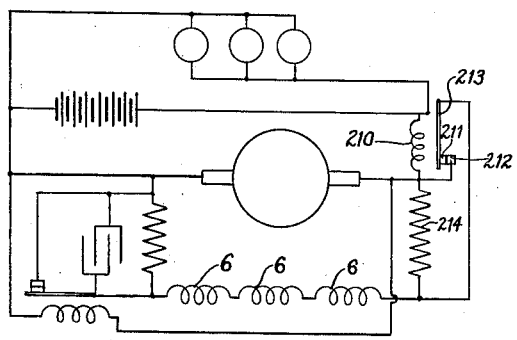

In the modification of Fig. 15, I have illustrated in addition to the circuit connections of Fig. 1, a winding 210, switch contacts 211 and 212 operable to be opened by attraction of an armature 213 by the winding 210; and a resistance unit 214 inserted in series with the field windings 6—6—6 when the contacts are opened. Normally the contacts are closed but upon an excessive current demand, or overload, in the battery, lamps, etc. of the supplied system the winding 210 will be energized sufficiently to open the contacts 211—213, insert the resistance 114, weaken the field, reducing the output to a safe value.

In the foregoing I have shown and described various apparatus and systems of connections whereby the voltage output of a generator of variable speed may be regulated to substantially a constant value. As hereinbefore mentioned, there are advantages to be obtained by what is called the "third brush" mode of generator regulation in which the current output is limited to a maximum predetermined value by armature reaction within the generator. I find that the voltage regulation system and apparatus of my invention hereinbefore described may be applied to a third brush current regulated generator thus providing a generator and system which will regulate both to a maximum current and to a substantially constant voltage at all speeds within the working range.

A typical instance wherein it may be desirable to employ both current regulation and voltage regulation, is a system in which the battery capacity is relatively great and, which, when its state of charge is low, may, upon being charged, draw from the generator an excessively great current. The third brush regulation will protect the generator by limiting the possible current to a predetermined maximum and the voltage regulation will protect the battery by preventing an excess charging current from flowing into it. The voltage regulation additionally will charge the battery at the maximum permissible rate and taper the charge in the well known manner of voltage regulation charging systems and at the same time will protect any lamp in the circuit against damage from high voltage.

A system whereby both types of regulation may be accomplished is illustrated in Fig. 17. The field windings 6—6—6 are energized by current from the third brush 175 of the generator either through contacts 25—26 when closed, or through a resistance 47 when the contacts are open, and the field winding 7 is energized directly across the main brushes of the generator. The regulation of the voltage is thus effected in a manner similar to that described hereinbefore, by opening of the contacts 25—26 and breaking the field circuit of the windings 6—6—6 or by inserting the resistance 47 in series with the windings 6—6—6, the contacts being operated by flux from the field winding 7 all as described hereinbefore. The current output will be regulated as in any well known third brush generator. Thus the current limit regulation may be referred to as being superimposed upon the voltage regulation.

In Fig. 16 an arrangement similar to that of Fig. 17 is shown but wherein the winding 7 is so connected as to be subject to the insertion of the resistance 47 upon opening of the contacts 25—26.

Any of the modifications of structure or modifications of wiring connections hereinbefore described may be employed to effect voltage regulation and other accessory functions in combination with the third brush current regulation features of the generator.

The generators hereinbefore discussed have been multi-polar generators having four poles. Obviously multi-polar generators with more than four poles may be employed with all the advantages of my invention.

My invention is also applicable, with slight changes, to bi-polar generators.

A suitable system for a bi-polar generator is shown in Fig. 18. The field windings 6—6 are connected across the generator brushes 190—190 either through a resistance 47 or directly through the engaged contacts 25 and 26. The contacts 25 and 26 are controlled by one of the windings 6 acting upon the armature 186.

In the practice of my invention, the effects of the voltage regulation upon the supplied system is generally similar to that of prior art voltage regulation systems. But the switch construction which I employ and its mode of operation distinguish from that of the prior art, in, among other features, the complete elimination of the relatively expensive regulating panels and complete electro-magnetically operated switches thereon and other prior art accessory apparatus. In all the forms embodying my invention, the switch contacts 25—26 controlling the field circuit and effecting voltage regulation to a substantially constant value, are operated by energy from a winding on a field pole. It will be seen that I completely eliminate all electro-magnetic windings especially provided to effect voltage regulation.

I claim:

1. In an electric generating system and apparatus, a variable speed multi-polar electric generator comprising a field pole and a shunt field winding on the pole, a load circuit for the generator and an electric switch having contacts controlling the load circuit, a local ferrous magnetic circuit structure generally of C-form disposed with the legs of the C straddling a portion of the turns of the field winding, a magnetically tractable switch-operating member disposed in the path of magnetic flux generated in the said element and adapted to be moved magnetically thereby to operate the switch contacts whenever the field energization rises to a predetermined value.

2. In combination with an electric generator having a ferrous field pole and an energizing winding therefor having an end turn portion spaced from the iron of the core, a switch comprising contacts and a magnetically tractable switch operating element disposed in the path of leakage flux generated by the end turn of the winding and operable thereby.

3. In an electric generating system and apparatus, an electric generator adapted to be driven at variable speed, the generator having a plurality of field energizing shunt windings, a switch in the circuit of one of the shunt windings adapted to reduce the energization thereof upon operation of its contacts, a magnetically tractable switch operating element disposed in the path of a portion of the flux generated by another of the shunt windings and adapted to operate the contacts whenever the generated voltage rises to a predetermined value, said other winding being energized commensurably with generated voltage.

4. In an electric generating system and apparatus, an electric generator adapted to be driven at variable speed, the generator having a plurality of field energizing windings, a switch in the circuit of one of the windings adapted to reduce the energization thereof upon operation of its contacts, a magnetically tractable switch operating element disposed in the path of a portion of the flux generated by another of the windings and adapted to operate the contacts whenever the generated voltage rises to a predetermined value, said other winding having an energizing circuit independent of said switch.

5. An electric generating system and apparatus as described in claim 3 and in which a resistance is introduced in to the circuit of the first-mentioned winding by the opening of the switch contacts.

6. An electric generating system and apparatus as described in claim 4 and in which a resistance is inserted in the circuit of the first-mentioned winding upon opening of the switch contacts.

7. In an electric generating system and apparatus, an electric generator adapted to be driven at variable speed, the generator having a plurality of field energizing windings, a magnetically tractable switch operating element disposed in the path of a portion of the flux generated by one of the windings and adapted to operate the contacts whenever the generated voltage rises to a predetermined value, the winding being in two parts, contacts operable by the switch operating element and disposed in the circuit of another of the windings, the contacts being arranged to connect the two parts of the two-part winding in opposition magnetically when the contacts open and to connect them in series with the said other field winding.

8. In an electric generating system and apparatus, a variable speed multi-polar shunt field electric generator of the third brush current regulating type adapted to supply current up to a maximum value only and having a pair of main brushes and a third brush, a circuit for energizing a shunt field winding across a main brush and the third brush, a switch in the circuit adapted to insert resistance in the circuit when operated to open its contacts, a second circuit for energizing a second winding across the main brushes, a magnetically tractable switch operating element adapted to be operated to open the said contacts by flux generated by the second winding whenever the generated voltage rises to a predetermined value.

9. In an electric generating system and apparatus, a variable speed multi-polar shunt field electric generator of the third brush current regulating type adapted to supply current up to a maximum value only and having a pair of main brushes and a third brush, a circuit for energizing a shunt field winding across a main brush and the third brush, a switch in the circuit adapted to insert resistance in the circuit when operated to open its contacts, a second circuit for energizing a second shunt field winding across the main brushes, a magnetically tractable switch operating element arranged to be operated to open the contacts by a portion of the flux generated by the second field winding whenever the generated voltage rises to a predetermined value.

10. In a voltage regulated electric generating system and apparatus, a generator having a plurality of field windings, a plurality of parallel circuits connecting the windings to the generator to be energized thereby, the generator being adapted to be driven at variable speed, a switch adapted to reduce the energizing current of all of the field windings upon operation of its contacts, a magnetically movable switch operating element disposed in the path of a part of the flux produced by one of the windings and adapted to operate the said contacts whenever the generated voltage rises to a predetermined value.

11. In a voltage regulated electric generating system and apparatus, a generator having a plurality of field windings, a plurality of parallel circuits connecting the windings to the generator to be energized thereby, the generator being adapted to be driven at variable speed, a magnetically responsive means disposed to respond to a part of the flux produced by one of the windings and adapted to reduce the energizing current of all of the windings whenever the generated voltage rises to a predetermined value.

12. In an electric generating system and apparatus, an electric generator adapted to be driven at variable speed, the generator having a plurality of field energizing windings, and magnetically responsive means comprising a vibratory switch disposed to respond to a part of the flux generated by one of the windings and a resistance controlled by the switch to reduce the energization of the other windings whenever the generated voltage rises to a predetermined value, said one winding being energized commensurably with generated voltage.

13. In an electric generating system and apparatus, an electric generator adapted to be driven at variable speed, the generator having a plurality of field energizing windings, and magnetically responsive means comprising a vibratory switch disposed to respond to a part of the flux generated by one of the windings and a resistance controlled by the switch to reduce the energization of the other windings whenever the generated voltage rises to a predetermined value, said one winding having an energizing circuit independent of said magnetically responsive means.

14. In an electric generating system and apparatus, a variable speed multi-polar shunt field electric generator of the third brush current regulating type adapted to supply current up to a maximum value only and having a pair of main brushes and a third brush, a circuit for energizing a shunt field winding across a main brush and the third brush, a second circuit for energizing a second winding across the main brushes, a magnetically responsive means operable by flux generated by the second winding to reduce the energization of the first main circuit whenever the generated voltage rises to a predetermined value.

15. In combination with an electric generator having a ferrous field pole and an energizing winding thereon, a switch comprising contacts and a magnetically tractable switch operating element disposed in the path of leakage flux occurring between the turns of the winding and the pole.

16. In combination with an electric generator having a ferrous field pole and an energizing winding thereon, a switch operating element and a local ferrous magnetic circuit element looped with turns of the field winding.

17. In combination with an electric generator having a ferrous field pole, and an energizing winding thereon having an end turn portion spaced from the iron of the core, a switch comprising contacts and a magnetically tractable switch operating element and a local ferrous magnetic element looped through end turns of the field winding and magnetically energizable thereby.

18. In an electric generating system, a generator adapted to be driven at variable speed and having a load circuit and a plurality of field coils, one of said field coils being energized from the generator independently of the other field coil or coils, and a pair of electric switches operable by flux generated by said one field coil and having contacts for controlling respectively the energization of said load circuit and said other field coil or coils.

19. In an electric generating system and apparatus, an electric generator adapted to be driven at variable speed, the generator having a plurality of field energizing windings, a switch in the circuit of one of the windings adapted to reduce the energization thereof upon operation of its contacts, a magnetically tractable switch operating element disposed in the path of a portion of the flux generated by another of the windings and adapted to operate the contacts whenever the generated voltage rises to a predetermined value, and a resistance adapted to be introduced into the circuit of the first mentioned winding by the opening of the switch contacts, said other winding being energized commensurably with generated voltage.

20. In an electric generating system and apparatus, an electric generator adapted to be driven at variable speed, the generator having a plurality of field energizing shunt windings, and magnetically responsive means comprising a vibratory switch disposed to respond to a part of the flux generated by one of the shunt windings and adapted to reduce the energization of the other shunt winding whenever the generated voltage rises to a predetermined value, said one winding being energized commensurably with the generated voltage.

21. In an electric generating system and apparatus, an electric generator adapted to be driven at variable speed, the generator having a plurality of field energizing shunt windings, and magnetically responsive means comprising a vibratory switch disposed to respond to a part of the flux generated by one of the shunt windings and a resistance controlled by the switch to reduce the energization of the other shunt winding whenever the generated voltage rises to a predetermined value, said one winding being energized commensurably with generated voltage and having an energizing circuit independent of said other winding.

DALE S. COLE.